(12) United States Patent
Li et al.

(10) Patent No.: US 12,570,203 B2
(45) Date of Patent: Mar. 10, 2026

(54) SAFELY WINDING WEBBING AND TENSIONING DEVICE CONTROLLED BY INERTIA CENTRIFUGAL FORCE

(71) Applicant: Taizhou Runjie Logistics Safety Equipment Technology Co., Ltd., Taizhou (CN)

(72) Inventors: Chunzhi Li, Taizhou (CN); Jing Zhou, Taizhou (CN); Xianwei Yang, Taizhou (CN); Fengquan Ma, Taizhou (CN)

( * ) Notice: Subject to any disclaimer, the term of this patent is extended or adjusted under 35 U.S.C. 154(b) by 141 days.

(21) Appl. No.: 18/410,389

(22) Filed: Jan. 11, 2024

(65) Prior Publication Data

US 2025/0026516 A1     Jan. 23, 2025

(30) Foreign Application Priority Data

Jul. 18, 2023    (CN) .......................... 202310879651.1

(51) Int. Cl.
*B60P 7/08*          (2006.01)
*B65B 13/22*          (2006.01)
(Continued)

(52) U.S. Cl.
CPC ............. B60P 7/0823 (2013.01); B60P 7/083 (2013.01); B60P 7/0846 (2013.01); (Continued)

(58) Field of Classification Search
CPC .......... B60P 7/08; B60P 7/0823; B60P 7/083; B60P 7/0846; B60P 7/0838; B65H 75/10; (Continued)

(56) References Cited

U.S. PATENT DOCUMENTS 479,026 A * 7/1892 Smeal ................... F16B 45/028
                                                      24/601.5
2,270,271 A * 1/1942 Coffing .................... B66D 3/14
                                                      254/223
(Continued)

FOREIGN PATENT DOCUMENTS

CN          105686316 A  * 6/2016   ............ B60P 7/0823
CN          211366625 U  * 8/2020   ............ B65H 75/48
(Continued)

*Primary Examiner* — Anna M Momper
*Assistant Examiner* — Raveen J Dias

(57)          ABSTRACT

The invention discloses a safely winding webbing and tensioning device controlled by inertia centrifugal force, which relates to the technical field of the tensioner, including a handle component, a base component and a long webbing; the handle component includes handles and ratchet wheels, and the base component includes a base, handles being pivotally and rotatably connected with the base through spiral spring shaft; one end of the spiral spring shaft is equipped with a centrifugal braking component, which includes a brake disc, a brake cover, brake pawls, and return pressure springs; the invention is reasonably designed, and is equipped with brake function to avoid swing of long webbing and injuring the operator, safeguarding safety of the operator; meanwhile, it's also equipped with handle limiting function, which has significantly improved smoothness and service life of using the tensioning device, with excellent practicability.

6 Claims, 10 Drawing Sheets

(51) Int. Cl.
　　*B65H 75/40* 　　　(2006.01)
　　*B65H 75/44* 　　　(2006.01)
(52) U.S. Cl.
　　CPC ....... *B65H 75/406* (2013.01); *B65H 75/4431*
　　　　　(2013.01); *B65H 75/4492* (2013.01); *B65B*
　　　　　*13/22* (2013.01); *B65H 2701/375* (2013.01)
(58) Field of Classification Search
　　CPC ........ B65H 75/30; B65H 75/38; B65H 75/40;
　　　　　B65H 75/406; B65H 75/42; B65H
　　　　　75/425; B65H 75/4428; B65H 75/4431;
　　　　　B65H 75/4476; B65H 75/4481; B65H
　　　　　75/4492; B65H 75/4494; B65H 54/585;
　　　　　B65H 2403/40; B65H 2403/46; B65H
　　　　　2601/30; B65H 2701/375; B65H 75/4447;
　　　　　B65D 25/10; B65D 25/101; B65D 13/22;
　　　　　B65B 13/22
　　USPC ......... 410/100; 242/362; 254/219, 220, 229,
　　　　　254/296, 342, 343; 24/68 CD, 68 R,
　　　　　24/69 ST, 69 TM, 70 ST
　　See application file for complete search history.

(56) References Cited

U.S. PATENT DOCUMENTS

| | | | | | |
|---|---|---|---|---|---|
| 3,910,558 | A | * | 10/1975 | Brucker | B60P 7/083 |
| | | | | | 410/103 |
| 4,083,511 | A | * | 4/1978 | Ikesue | B60R 22/405 |
| | | | | | 242/383.4 |
| 4,228,970 | A | * | 10/1980 | Morinaga | B60R 22/405 |
| | | | | | 242/383.5 |
| 4,877,110 | A | * | 10/1989 | Wolner | A62B 35/0093 |
| | | | | | D29/124 |
| 5,524,833 | A | * | 6/1996 | Modinger | B60R 22/36 |
| | | | | | 242/379 |
| 5,526,996 | A | * | 6/1996 | Ebner | B60R 22/4619 |
| | | | | | 242/379.1 |
| 5,771,993 | A | * | 6/1998 | Anderson | A62B 35/04 |
| | | | | | 182/237 |
| 7,854,043 | B2 | * | 12/2010 | Wang | B60P 7/083 |
| | | | | | 254/218 |
| 8,251,304 | B2 | * | 8/2012 | Boyer | A62B 1/10 |
| | | | | | 242/384 |
| 8,387,217 | B1 | * | 3/2013 | Hinds | A63B 21/00065 |
| | | | | | 24/265 H |
| 8,430,207 | B2 | * | 4/2013 | Griffiths | A62B 1/08 |
| | | | | | 242/381.5 |
| 8,651,509 | B1 | * | 2/2014 | Huang | B60D 1/185 |
| | | | | | 280/480.1 |
| 9,056,753 | B2 | * | 6/2015 | Luntz | B66D 3/046 |
| 9,751,450 | B1 | * | 9/2017 | Zhou | B60P 7/083 |
| 10,661,106 | B2 | * | 5/2020 | Choate | A62B 35/0093 |
| 10,723,255 | B2 | * | 7/2020 | Plahuta | B60P 7/0846 |
| 10,828,516 | B2 | * | 11/2020 | Chabod | A62B 1/10 |
| 10,960,243 | B2 | * | 3/2021 | Chen | A62B 1/10 |
| 11,643,004 | B2 | * | 5/2023 | Chen | B60P 7/0846 |
| | | | | | 410/100 |
| 2003/0059269 | A1 | * | 3/2003 | Bosley | B60P 7/083 |
| | | | | | 410/100 |
| 2003/0145434 | A1 | * | 8/2003 | Lin | B60P 7/0823 |
| | | | | | 24/68 CD |
| 2004/0084558 | A1 | * | 5/2004 | Huang | B65H 54/585 |
| | | | | | 242/385.4 |
| 2006/0197072 | A1 | * | 9/2006 | Huang | B60P 7/083 |
| | | | | | 24/68 CD |
| 2007/0189873 | A1 | * | 8/2007 | Breeden | B60P 7/083 |
| | | | | | 410/100 |
| 2008/0197227 | A1 | * | 8/2008 | Pelliccioni | B60P 7/083 |
| | | | | | 242/416 |
| 2010/0322737 | A1 | * | 12/2010 | Huang | B60P 7/083 |
| | | | | | 410/100 |
| 2011/0005047 | A1 | * | 1/2011 | Gangakhedkar | A44B 11/06 |
| | | | | | 24/600.9 |
| 2011/0179609 | A1 | * | 7/2011 | Huang | B60P 7/083 |
| | | | | | 24/68 CD |
| 2012/0233824 | A1 | * | 9/2012 | Breeden | B60P 7/0823 |
| | | | | | 24/68 CD |
| 2013/0036580 | A1 | * | 2/2013 | Huang | B60P 7/083 |
| | | | | | 24/68 CD |
| 2014/0008480 | A1 | * | 1/2014 | Kingery | B60P 7/083 |
| | | | | | 242/389 |
| 2014/0042256 | A1 | * | 2/2014 | Yamada | B65H 75/4434 |
| | | | | | 242/382.1 |
| 2015/0352997 | A1 | * | 12/2015 | Huang | B65H 16/005 |
| | | | | | 242/407 |
| 2016/0052442 | A1 | * | 2/2016 | Yang | B65B 13/025 |
| | | | | | 24/68 CD |
| 2016/0250961 | A1 | * | 9/2016 | Tolly | B60P 7/0846 |
| | | | | | 410/100 |
| 2016/0347233 | A1 | * | 12/2016 | Kingery | B60P 7/0846 |
| 2017/0120797 | A1 | * | 5/2017 | Zhou | B60P 7/083 |
| 2018/0339637 | A1 | * | 11/2018 | Hatcher | B60P 7/083 |
| 2019/0255983 | A1 | * | 8/2019 | Zhou | B65H 54/585 |
| 2019/0255984 | A1 | * | 8/2019 | Kingery | B60P 7/0846 |
| 2019/0366905 | A1 | * | 12/2019 | Persson | A61G 3/0808 |
| 2020/0339029 | A1 | * | 10/2020 | Chen | B60P 7/0823 |
| 2021/0170937 | A1 | * | 6/2021 | Chen | B60P 7/083 |
| 2022/0111783 | A1 | * | 4/2022 | Zhou | B60P 7/0846 |
| 2023/0086721 | A1 | * | 3/2023 | Sato | B60R 22/48 |
| | | | | | 242/362 |
| 2024/0359936 | A1 | * | 10/2024 | Huang | B65H 75/4481 |
| 2024/0409022 | A1 | * | 12/2024 | Chen | B60P 7/083 |
| 2025/0128656 | A1 | * | 4/2025 | Brooks | B60P 3/079 |
| 2025/0162489 | A1 | * | 5/2025 | Song | B60P 7/083 |
| 2025/0187526 | A1 | * | 6/2025 | Pan | B60P 7/083 |
| 2025/0197163 | A1 | * | 6/2025 | Campanella | B65H 75/4431 |
| 2025/0326348 | A1 | * | 10/2025 | Zhou | B60P 7/083 |

FOREIGN PATENT DOCUMENTS

| | | | | | | |
|---|---|---|---|---|---|---|
| CN | | 112248916 | A | * | 1/2021 | B60P 7/0846 |
| CN | | 222629196 | U | * | 3/2025 | B60P 7/08 |

* cited by examiner

SAFELY WINDING WEBBING AND TENSIONING DEVICE CONTROLLED BY INERTIA CENTRIFUGAL FORCE

1. TECHNICAL FIELD

The invention relates to the technical field of tensioner, in particular to a safely winding webbing and tensioning device controlled by inertia centrifugal force.

2. BACKGROUND ART

Tensioner is a kind of logistics bundling apparatus, used for fixing goods in the logistics process, with the aim of preventing goods from displacing and shaking so as to guarantee logistics safety.

The common tensioner generally includes handle component, base component, ratchet wheel and short and long webbings, when fixing the goods, the short and long webbings will be fixed in the fixed position (or short and long webbings being interconnected), then, pulling the handle component back and forth, ratchet wheels are driven to rotate by the movable pawl on the handle component, and then make the drive shaft connected to the ratchet wheels rotate, winding the webbing until the length of the webbing reaches the limit to complete fixing of goods; when there is a need to untie the goods, it only needs to rotate the handle component to a specified angle, so that the movable pawl is detached from the ratchet wheel, and the stop pawl on the base component is pushed up by the handle side plate of the handle component, and is detached from the ratchet wheel, at which time the long webbing can be pulled out, so as to achieve the purpose of unfastening goods. Some tensioners have independent power source (generally spiral spring, at which time the drive shaft is connected to the spiral spring, essentially a spiral spring shaft), which has functional characteristic of automatically winding the long webbing when unfastening the goods.

When automatically winding the long webbing of this kind of tensioner with a power source, the winding speed needs to be carefully controlled, so as to avoid swing of long webbing and injuring the operator, therefore, it need to be configured with corresponding brake mechanism.

3. SUMMARY OF THE INVENTION

Aimed at problems proposed in background, the invention provides a safely winding webbing and tensioning device controlled by inertia centrifugal force.

In order to achieve above purpose, the invention provides the following technical schemes:

a safely winding webbing and tensioning device controlled by inertia centrifugal force, which relates to the technical field of the tensioner, including a handle component, a base component and a long webbing; the handle component includes handles and ratchet wheels, and the base component includes a base, handles being pivotally and rotatably connected with the base through spiral spring shaft; said ratchet wheels are fixedly mounted on two ends of the spiral spring shaft, and reel is provided between the ratchet wheels; the ratchet wheels, reel and spiral spring shaft rotate synchronously wherein said reel is sleeved on the outside of the spiral spring shaft and they are arranged coaxially; one side of the reel is provided with an opening for long webbing to pass through, one end of the long webbing is sleeved on the spiral spring shaft and leads out from one end of base through the opening on the reel, and one end of the spiral spring shaft is connected to the spiral spring box, which is characterized in that the other end of the spiral spring shaft is equipped with a centrifugal braking component;

Said centrifugal braking component includes a brake disc, a brake cover, brake pawls, and return pressure springs; the central part of the said brake disc is fixedly connected to the spiral spring shaft by means of screw; there is a plurality of said brake pawls, a plurality of brake pawls are distributed circumferentially around the brake disc and one end of brake pawls is rotatably connected to the brake disc; said return pressure springs are mounted on the brake disc and resiliently touch the brake pawls to provide brake pawls with a force of approaching the center of brake disc; said brake cover is fixedly mounted on the side of the base, and accommodates the brake disc, brake pawls and return pressure springs in the brake cover; a plurality of consecutive and circumferentially distributed internal teeth are provided on the annular inner wall of the brake cover facing the brake pawls;

A safely winding webbing and tensioning device controlled by inertia centrifugal force as described above, wherein one end of said base close to the long webbing is provided with a front cover;

Said front cover is reserved with a webbing passage for the long webbing to pass through and is provided with symmetrical limiting walls; the bottom of said base is provided with symmetrical bar-shaped limiting openings, said limiting walls and limiting openings cooperate to limit the handle so as to avoid the side of handle interfering with the side of ratchet wheels and base;

A safely winding webbing and tensioning device controlled by inertia centrifugal force as described above, wherein said long webbing is connected with a hook; said front cover is located at one end of the base with the webbing passage thereon extending to the other end of the base and in the shape of shrink mouth for catching one end of the hook;

The above-described a safely winding webbing and tensioning device controlled by inertia centrifugal force, wherein the opening of said hook is provided with a safety mechanism, comprising a return spring and a safety sleeve, said return spring being mounted on the hook, and said safety sleeve being sleeved on the return spring and elastically sealing off the opening of hook under the action of the return spring;

The above-described a safely winding webbing and tensioning device controlled by inertia centrifugal force, wherein said long webbing forms a C-shaped corner in the area of the opening of the reel, and a protective portion is provided on the inner surface of said C-shaped corner; the protective portion is formed by sewing multi layers of long webbing ends or one or more layers of protective pad connected to the long webbing through sewing;

The above-described a safely winding webbing and tensioning device controlled by inertia centrifugal force, wherein one end of said base opposite to the long webbing is provided with a detachable connecting shaft, said connecting shaft being connected to one or more kind of short webbing, hook, buckle and fixed mounting plate;

The above-described a safely winding webbing and tensioning device controlled by inertia centrifugal force, wherein said centrifugal brake component can be replaced with inertia brake component;

Said inertia brake component comprises an inertia brake disc, an eccentric brake pawl and an inertia brake cover; said inertia brake disc is fixedly connected to the spiral spring shaft and rotating synchronously with the spiral spring shaft; the middle part of the inertia brake disc is provided with a C-shaped brake rod with a C-shaped cross-section; a hole is provided in the center of said eccentric brake pawl and a linkage groove and a brake groove is provided in the hole; a diagonal transition segment is provided between the linkage groove and the brake groove; said eccentric brake pawl is eccentrically sleeved on the C-shaped brake rod, and brake outer teeth are provided on its outer surface away from the brake groove; said inertia brake cover is fixedly mounted on the side of the base, with the inertia brake disc and eccentric brake pawl accommodated in the inertia brake cover; a plurality of consecutive and circumferentially distributed brake internal teeth are provided on the annular inner wall of the inertia brake cover facing the inertia brake disc.

The advantageous effects of the invention are as follows: the invention discloses a safely winding webbing and tensioning device controlled by inertia centrifugal force, which relates to the technical field of the tensioner, including a handle component, a base component and a long webbing; the handle component includes handles and ratchet wheels, and the base component includes a base, handles being pivotally and rotatably connected with the base through spiral spring shaft; one end of the spiral spring shaft is equipped with a centrifugal braking component, which includes a brake disc, a brake cover, brake pawls, and return pressure springs; the invention is reasonably designed, and is equipped with brake function to avoid swing of long webbing and injuring the operator, safeguarding safety of the operator; meanwhile, it's also equipped with handle limiting function, which has significantly improved smoothness and service life of using the tensioning device, with excellent practicability.

4. BRIEF DESCRIPTION OF ACCOMPANY DRAWINGS

Figure 1:
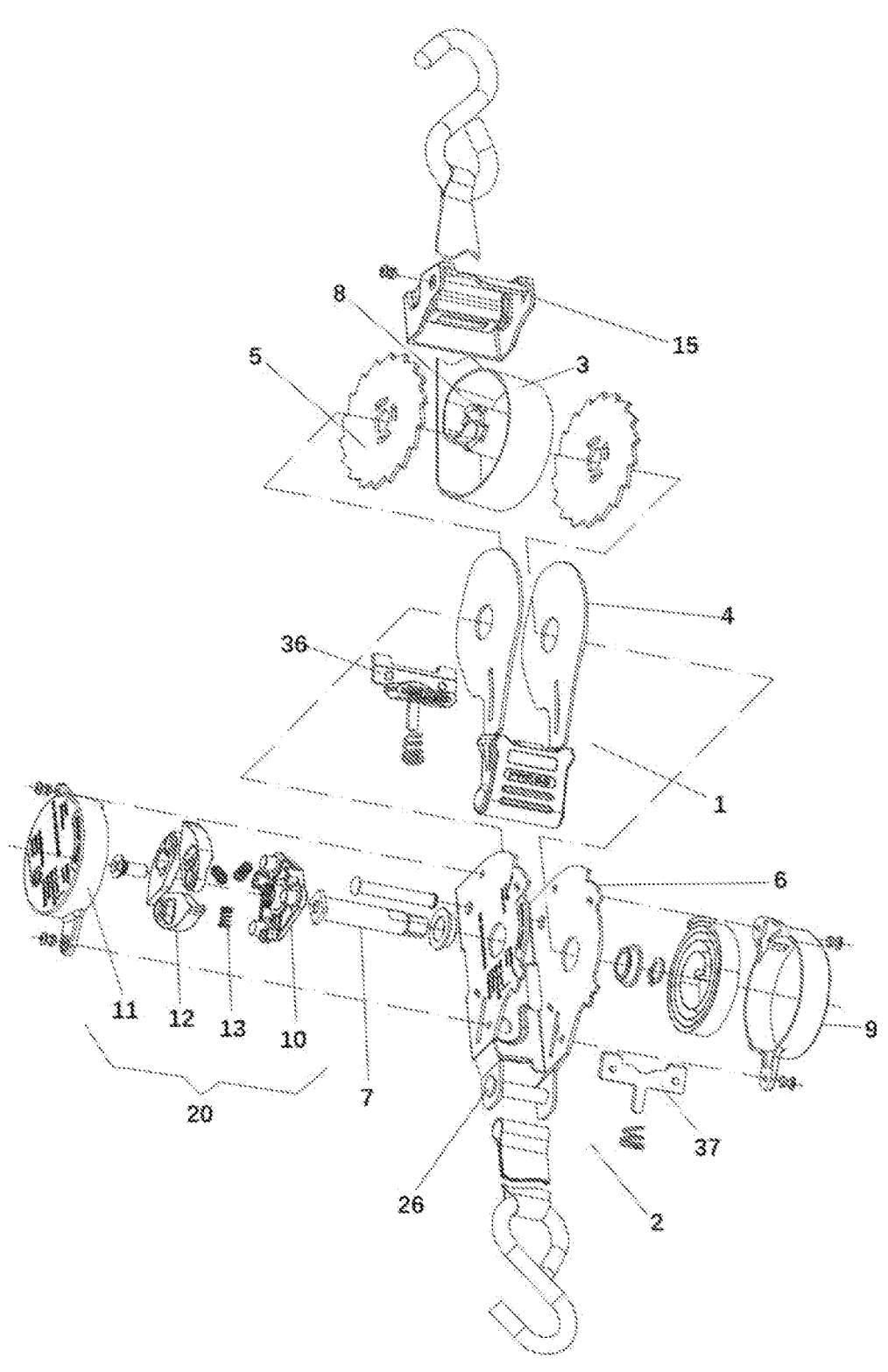
FIG. 1 shows the exploded view of the invention.
Figure 2:
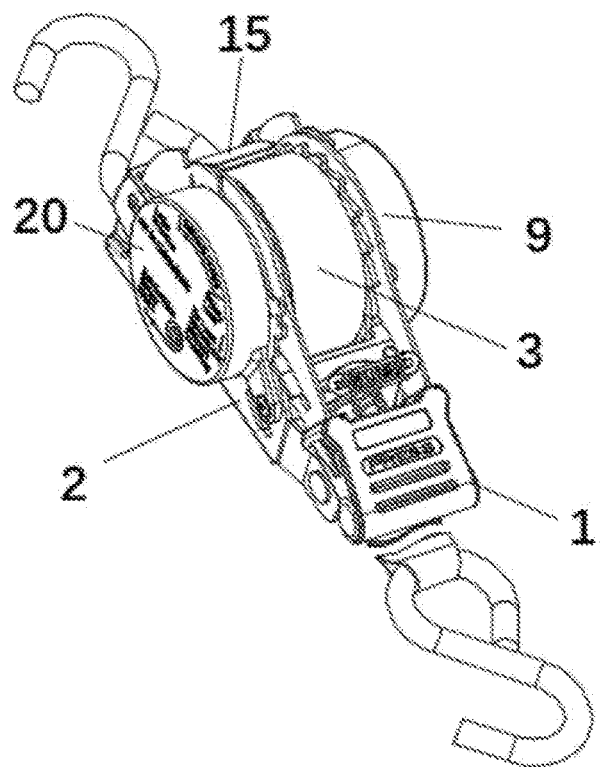
FIG. 2 shows the schematic diagram of the combined state of the invention.
Figure 3:
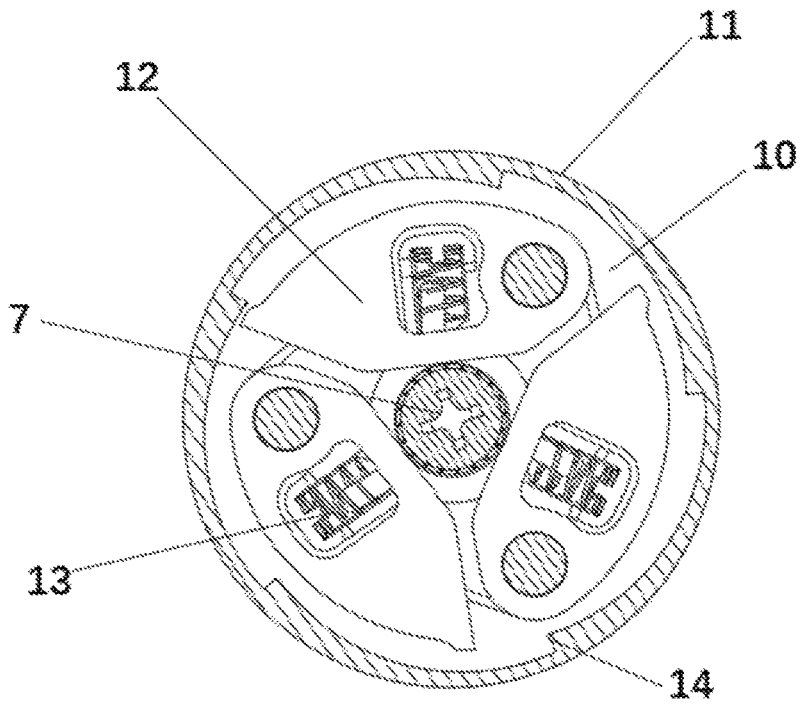
FIG. 3 shows the interior schematic diagram of the centrifugal brake component.
Figure 4:
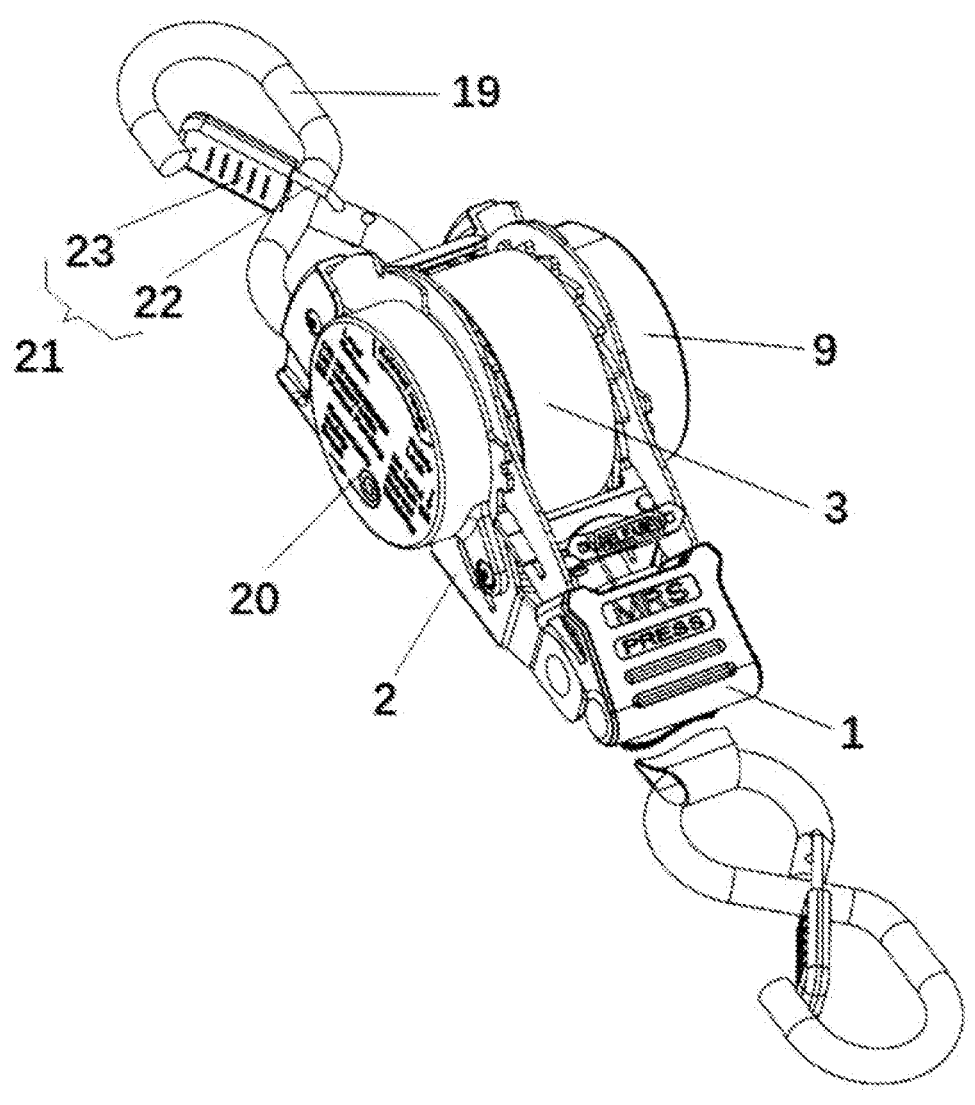
FIG. 4 shows the schematic diagram of the combined state of the invention (Embodiment 2-4).
Figure 5:
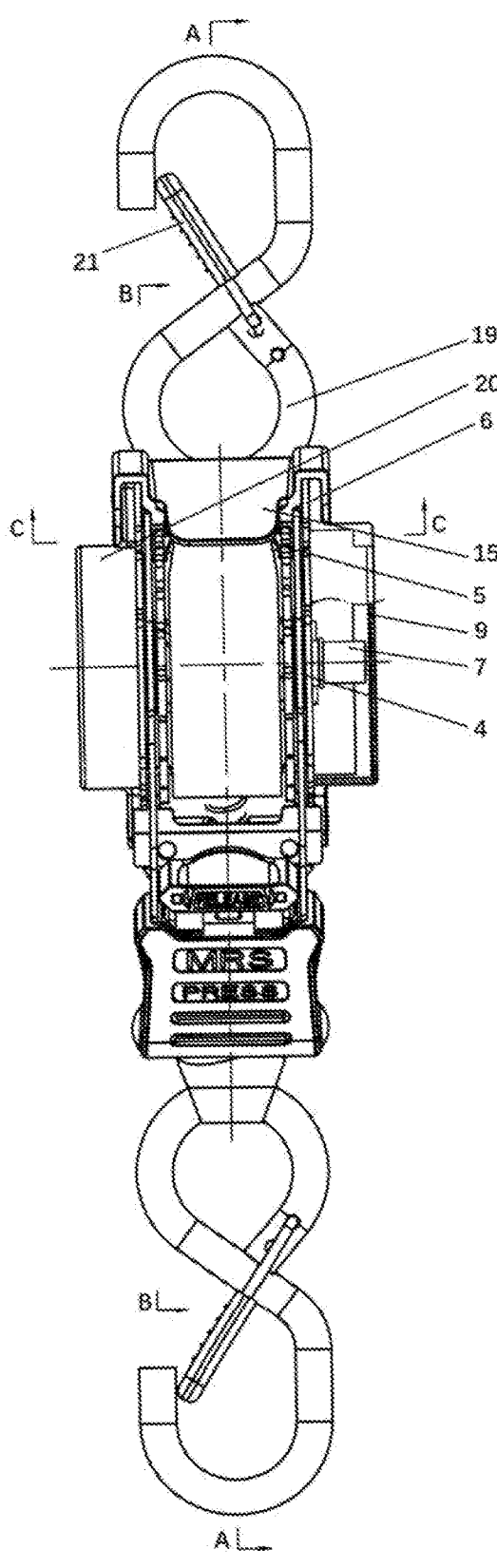
FIG. 5 shows the top view of the invention (Embodiment 2-4).
Figure 6:
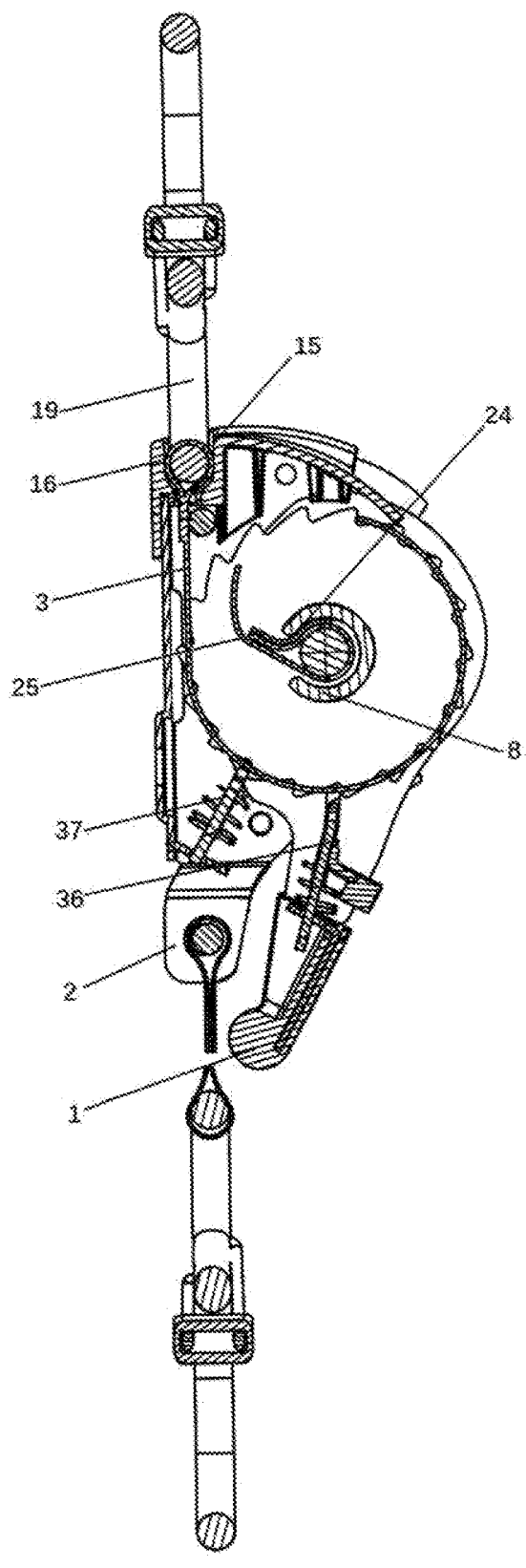
FIG. 6 shows the cross-sectional view in the direction of A-A in FIG. 5.
Figure 7:
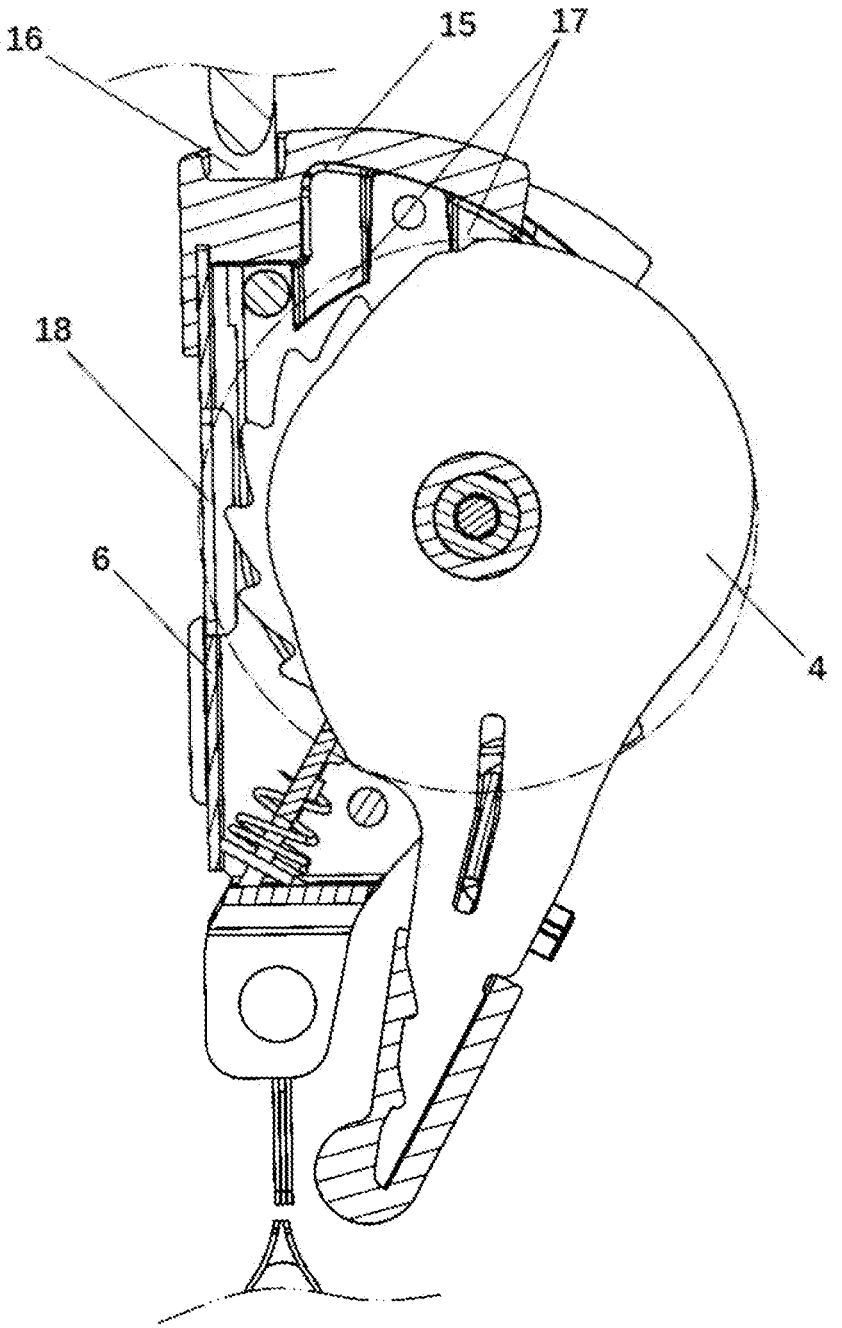
FIG. 7 shows the cross-sectional view in the direction of B-B in FIG. 5.
Figure 8:
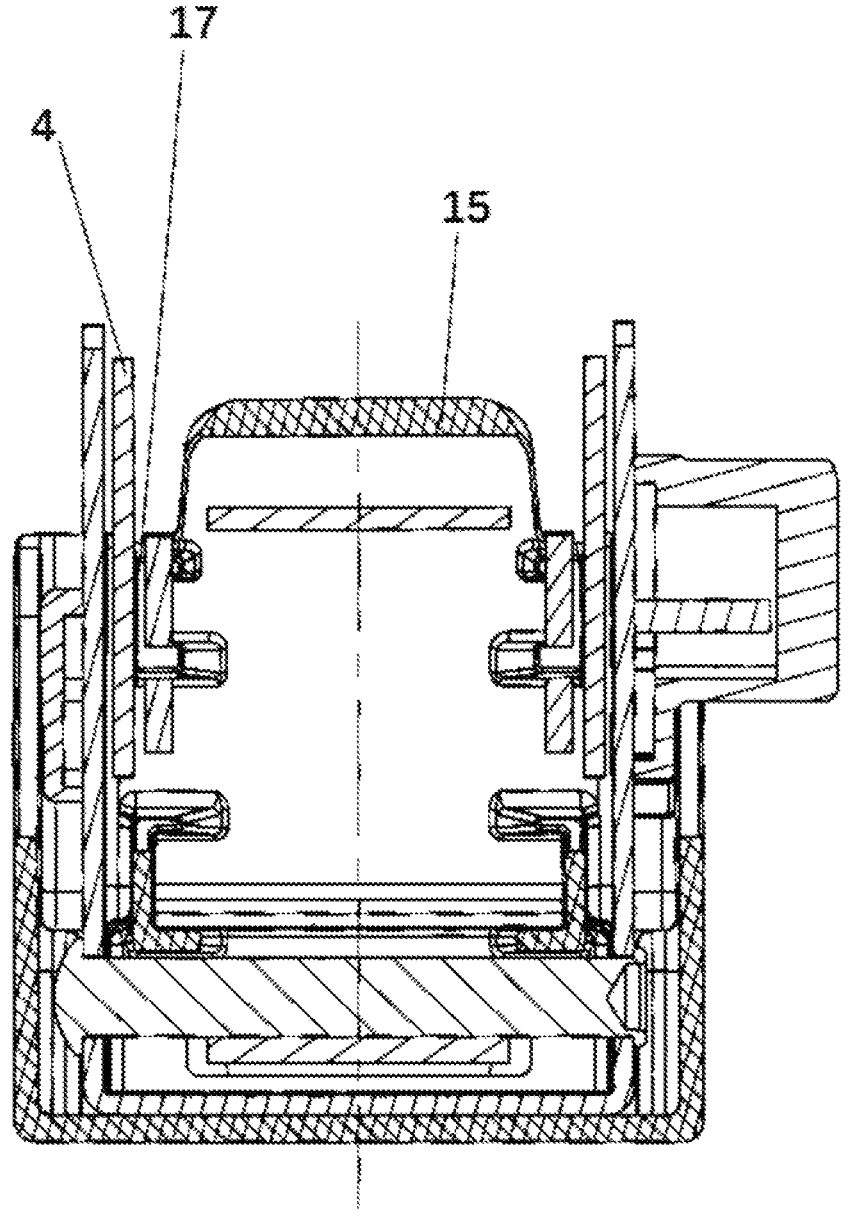
FIG. 8 shows the cross-sectional view in the direction of C-C in FIG. 5.
Figure 9:
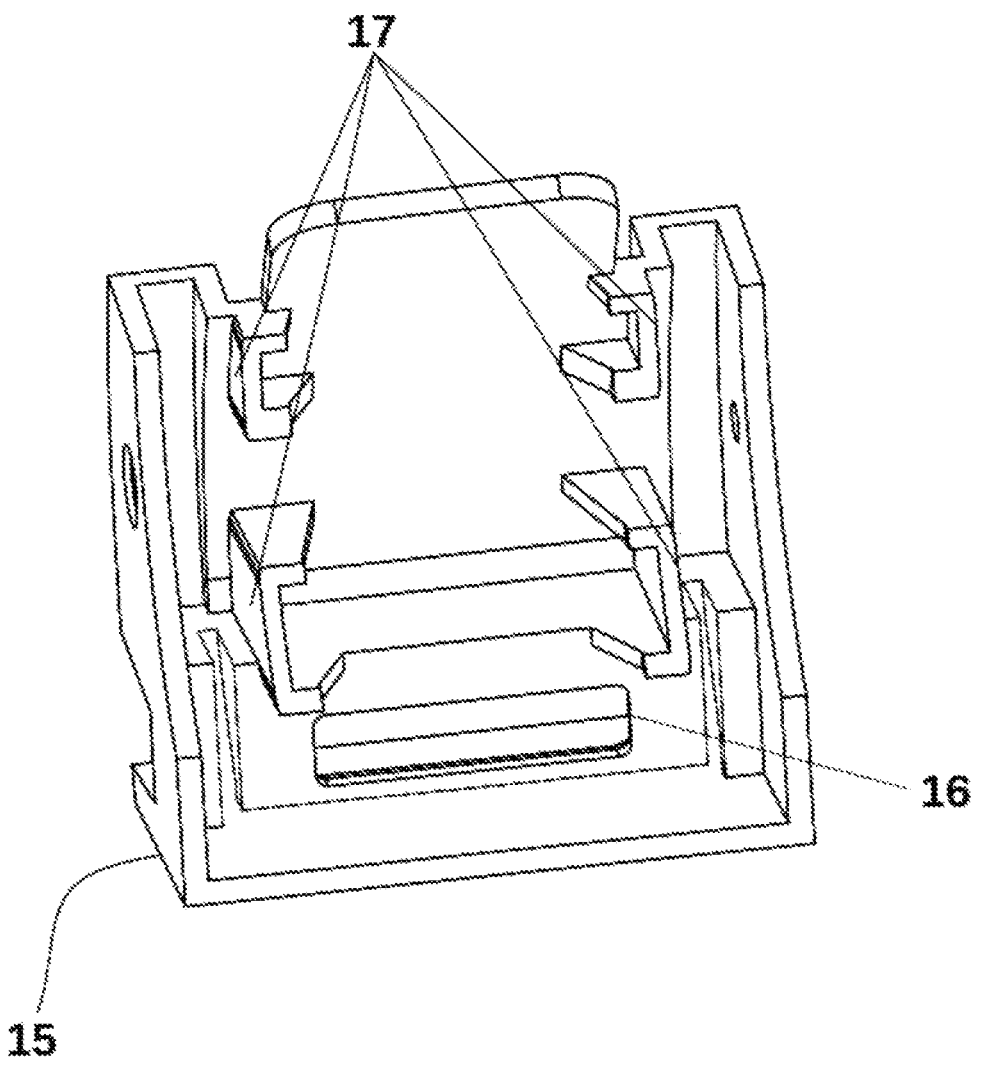
FIG. 9 shows the schematic view of the front cover.
Figure 10:
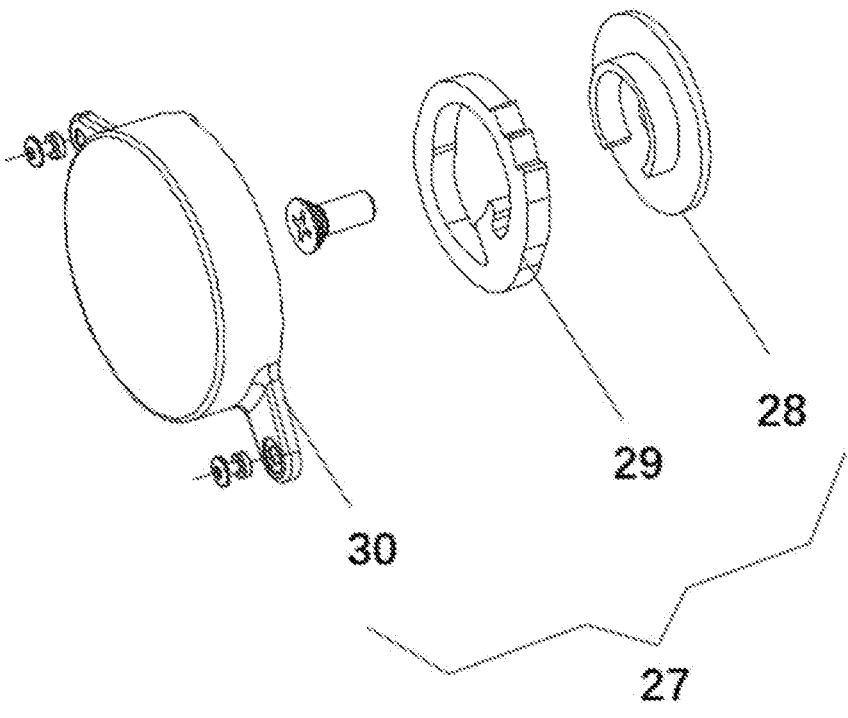
FIG. 10 shows the exploded view of the inertia brake component.
Figure 11:
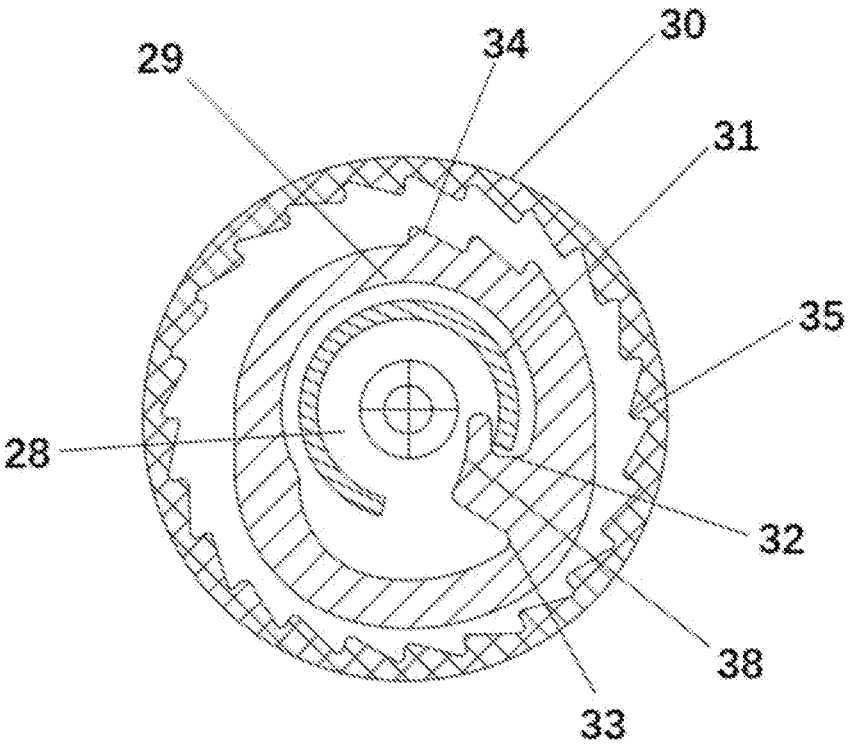
FIG. 11 shows the interior schematic diagram of the inertia brake component (unwound state).
Figure 12:
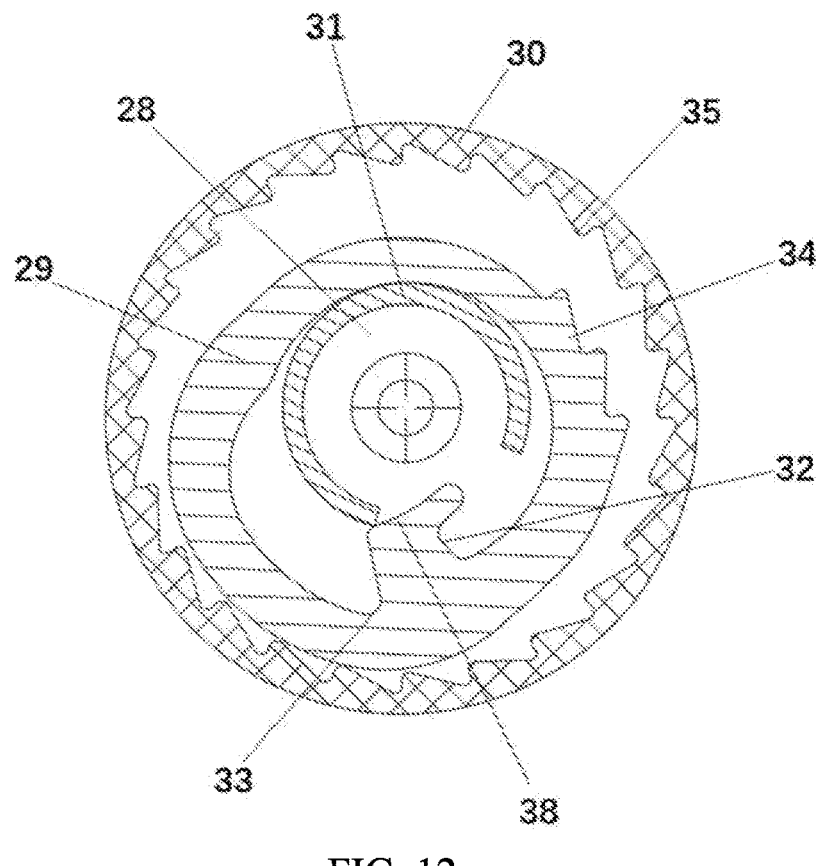
FIG. 12 shows the interior schematic diagram of the inertia brake component (winding state).
Figure 13:
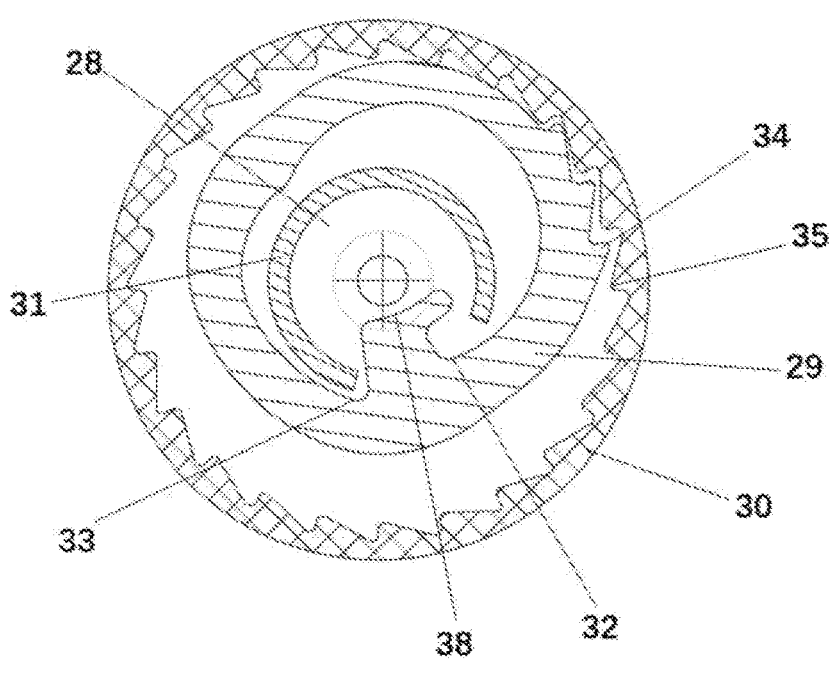
FIG. 13 shows the interior schematic diagram of the inertia brake component (locking state).

As shown in the accompanying drawings: 1 handle component, 2 base component, 3 long webbing, 4 handle, 5 ratchet wheel, 6 base, 7 spiral spring shaft, 8 reel, 9 spiral spring box, 10 brake disc, 11 brake cover, 12 brake pawl, 13 return pressure springs, 14 internal tooth, 15 front cover, 16 webbing passage, 17 limiting wall, 18 limiting opening, 19 hook, 20 centrifugal braking component, 21 safety mechanism, 22 return spring, 23 safety sleeve, 24 C-shaped corner, 25 protective portion, 26 connecting shaft, 27 inertia brake component 28 inertia brake disc, 29 eccentric brake pawl, 30 inertia brake cover, 31 C-shaped brake rod, 32 linkage groove, 33 brake groove, 34 brake outer tooth, 35 brake internal teeth, 36 movable pawl, 37 stop pawl, 38 transition segment

5. SPECIFIC EMBODIMENT OF THE INVENTION

The technical scheme of the invention is further described clearly and detailedly hereinafter with reference to the drawings. Obviously, only partial embodiments of the invention are shown and the actual structure is not limited thereto. All other embodiments, which can be obtained by those skilled in the art without making any creative effort based on the embodiments in the present invention, shall all fall within the protective scope of the invention.

Embodiment 1

As shown in the drawings, the embodiment discloses a safely winding webbing and tensioning device controlled by inertia centrifugal force, including a handle component 1, a base component 2 and a long webbing 3; the handle component 1 includes handles 4 and ratchet wheels 5, and the base component 2 includes a base 6, handles 4 being pivotally and rotatably connected with the base 6 through spiral spring shaft 7; said ratchet wheels 5 are fixedly mounted on two ends of the spiral spring shaft 7, and reel 8 is provided between the ratchet wheels 5; the ratchet wheels 5, reel 8 and spiral spring shaft 7 rotate synchronously wherein said reel 8 is sleeved on the outside of the spiral spring shaft 7 and they are arranged coaxially; one side of the reel 8 is provided with an opening for long webbing 3 to pass through, one end of the long webbing 3 is sleeved on the spiral spring shaft 7 and leads out from one end of base 6 through the opening on the reel 8, and one end of the spiral spring shaft 7 is connected to the spiral spring box 9; in addition, the handle component 1 also includes the movable pawl 36, and the base component 2 also includes the stop pawl 37; when fixing the goods, the end of the webbing is fixed firstly, and then, the handle component 1 is rotated to a specified angle, so that the movable pawl 36 and the stop pawl 37 are both disengaged from the ratchet wheel 5, and then, the spiral spring box 9 works, driving the spiral spring shaft 7 and reel 8 to rotate together to wind up the webbing until the goods are initially fixed by tensioning device; then the handle component 1 is pulled back and forth to drive the ratchet wheel 5 to rotate through the movable pawl 36 on the handle component 1, which in turn drives the spiral spring shaft 7 and the reel 8 to rotate together to wind up the webbing until the goods are fixed; when there is a need to unfasten the goods, the handle component 1 is rotated to a specified angle (said specified angle can be referred to the description of the no-load section, tightening section and release section in the document "A safely controlled winding strap tensioning device" disclosed in application number CN201922259689.0), so that the movable pawl 36 is disengaged from the ratchet wheel 5 and the stop pawl 37 is pulled; at this time, pulling out the long webbing appropriately so as to facilitate the unfastening of two ends of the webbing; when the tensioning device is unfastened, both the movable pawl 36 and stop pawl 37 are disengaged from the ratchet wheel 5, and the spiral spring box 9 works again to wind the webbing in place;

In order to avoid swing of long webbing and injuring the operator, the other end of the spiral spring shaft 7 is equipped with a centrifugal braking component;

Said centrifugal braking component 20 includes a brake disc 10, a brake cover 11, brake pawls 12, and return pressure springs 13; the central part of the said brake disc 10 is fixedly connected to the spiral spring shaft 7 by means of screw and rotates synchronously and coaxially with the spiral spring shaft 7; there is a plurality of said brake pawls 12, the number of which in the embodiment are three; three brake pawls 12 are distributed circumferentially around the brake disc 10 and one end of brake pawls 12 is rotatably connected to the brake disc 10; said return pressure springs 13 are mounted on the brake disc 10 and resiliently touch the brake pawls 12 to provide brake pawls 12 with a force of approach the center of brake disc 10; said brake cover 11 is fixedly mounted on the side of the base 6, and accommodates the brake disc 10, brake pawls 12 and return pressure springs 13 in the brake cover 11; a plurality of consecutive and circumferentially distributed internal teeth 14 are provided on the annular inner wall of the brake cover 11 facing the brake pawls 12; when automatically winding through the spiral spring box 9, the brake disc 10 rotates along with the spiral spring shaft 7 together; with the centrifugal effect, brake pawls 12 overcome the elastic force of return pressure spring 13 to approach the internal teeth 14 of brake cover 11, if the winding speed is too fast, the end of the brake pawls 12 will be in contact with the internal teeth 14 and stuck, the spiral spring shaft 7 is stuck, the webbing winding process is stopped; when it needs to wind the webbing again, pulling out a small section of the long webbing, so that the brake pawls 12 are disengaged from the internal teeth 14; at this time, the centrifugal brake component 20 returns to unlocked state, and it can continue to automatically wind the webbing until the webbing is wound in place; during this process, the winding speed of the webbing is indirectly controlled, which effectively safeguards the personal safety of the operator.

Embodiment 2

The embodiment discloses a safely winding webbing and tensioning device controlled by inertia centrifugal force, wherein one end of said base 6 close to the long webbing 3 is provided with a front cover 15;

Said front cover is reserved with a webbing passage 16 for the long webbing 3 to pass through and is provided with symmetrical limiting walls 17; the bottom of said base 6 is provided with symmetrical bar-shaped limiting openings 18, said limiting walls 17 and limiting openings 18 cooperate to limit the handle 4; when the handle component 4 rotates, the side plate of handle 4 will move in the effect of limiting walls 17 and limiting openings 18 so as to avoid the side of handle 4 interfering with the side of ratchet wheels 5 and base 6; firstly, it can improve the smoothness of using the tensioning device and use it with less effort; secondly, it can reduce the deformation of the handle 4 due to use, reduce friction and increase the service life of the tensioning device.

In addition, in the embodiment, said long webbing 3 is connected with a hook 19; said front cover 15 is located at one end of the base 6 with the webbing passage 16 thereon extending to the other end of the base 6 and in the shape of shrink mouth, which enables the webbing passage 16 in the shape of slot, and has a certain depth, so that when the long webbing 3 is completely wound up, one end of the hook 19 on the long webbing 3 can be stuck into the webbing passage 16 to play a role in fixing the hook 19 and prevents the hook 19 from swaying and reduces safety hazards.

Embodiment 3

The embodiment discloses a safely winding webbing and tensioning device controlled by inertia centrifugal force, wherein the opening of said hook 19 is provided with a safety mechanism 21 for preventing the hook 19 from accidentally detaching in fixed state, increasing safety of use; specifically, the safety mechanism comprises a return spring 22 and a safety sleeve 23; said return spring 22 is mounted on the hook 19 and is equipped with an elastic force for elastically approaching the opening of the hook 19, said safety sleeve 23 being sleeved on the return spring 22; at this time, the safety sleeve 23 elastically seals off the opening of hook 19 under the action of the return spring 22;

Embodiment 4

The embodiment discloses a safely winding webbing and tensioning device controlled by inertia centrifugal force, wherein along with the winding of the long webbing 3, the long webbing 3 can be wound outside the reel 8; at this time, the end of said long webbing 3 forms a C-shaped corner 24 in the area of the opening of the reel 8; with the tightening of the tensioning device, great pressure and friction will be generated in the area of the inner surface of this C-shaped corner 24 and opening of the reel 8, in order to ensure the service life of the long webbing 3, a protective portion 25 is provided on above-mentioned area; the protective portion 25 is formed by sewing multi layers of long webbing 3 ends or one or more layers of protective pad connected to the long webbing 3 through sewing;

In addition, one end of base 6 in the embodiment opposite to the long webbing 3 is provided with a detachable connecting shaft 26, said connecting shaft 26 being connected to one or more kind of short webbing, hook, buckle and fixed mounting plate, which also includes other fasteners with fixing function;

Embodiment 5

The embodiment discloses a safely winding webbing and tensioning device controlled by inertia centrifugal force, wherein said centrifugal brake component 20 can be replaced with inertia brake component 27;

Said inertia brake component 27 comprises an inertia brake disc 28, an eccentric brake pawl 29 and an inertia brake cover 30; said inertia brake disc 28 is fixedly connected to the spiral spring shaft 7 and rotating synchronously with the spiral spring shaft 7; the middle part of the inertia brake disc 28 is provided with a C-shaped brake rod 31 with a C-shaped cross-section; a hole is provided in the center of said eccentric brake pawl 29 and a linkage groove 32 and a brake groove 33 is provided in the hole; said eccentric brake pawl 29 is eccentrically sleeved on the C-shaped brake rod 31, and brake outer teeth 34 are provided on its outer surface away from the brake groove 33; said inertia brake cover 30 is fixedly mounted on the side of the base 6, with the inertia brake disc 28 and eccentric brake pawl 29 accommodated in the inertia brake cover 30; a plurality of consecutive and circumferentially distributed brake internal teeth 35 are provided on the annular inner wall of the inertia brake cover 30 facing the inertia brake disc 28; a diagonal transition segment 38 is provided between the linkage groove 32 and the brake groove 33; when the webbing is normally unwound, the inertia brake disc 28 connected with the spiral spring shaft 7 drives the C-shaped brake rod 31 to rotate; at this time, the C-shaped opening of the C-shaped brake rod 31 is stuck into the linkage groove 32, the brake outer teeth 34 are not in contact with the brake internal teeth 35, and the webbing can be continuously unwound; when the webbing is being wound, one side of the C-shaped opening of the C-shaped brake rod 31 is continuously pressed against the transition segment 38, and enables the brake outer teeth 34 on the eccentric brake pawl 29 far away from the brake internal teeth 35, and the webbing can be continuously wound; however, when the winding speed is too fast, the eccentric brake pawl 29, under the effect of impact rebound and inertia, makes the C-shaped opening of the C-shaped brake rod 31 stuck in the brake groove 33, and at this time, the brake outer teeth 34 is engaged with the brake internal teeth 35, the inertial brake component 27 is in the state of braking, and the webbing winding process is stopped; until the webbing is drawn out for some distance, the brake outer teeth 34 is contacted and engaged with the brake internal teeth 35, and the webbing can be wound again.

In the description of the embodiments of the invention, it should be further noted that unless otherwise explicitly stated or limited, the terms "arranged", "mounted", and "connected" should be interpreted broadly, and may be, for example, fixedly connected, detachably connected, or integrally connected; can be mechanically or electrically connected; they may be connected directly or indirectly through intervening media, or they may be interconnected between two elements. The specific meanings of the above terms in the invention can be understood by those skilled in the art according to specific situations.

The standard parts used in this invention can be purchased from the market, and the special-shaped parts can be customized according to the specification and the accompanying drawings.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A safely winding webbing and tensioning device controlled by inertia centrifugal force, including a handle (4) component (1), a base (6) component (2) and a long webbing (3); the handle (4) component (1) includes handles (4) and ratchet wheels (5), and the base (6) component (2) includes a base (6), the handles (4) being pivotally and rotatably connected with the base (6) through a spiral spring shaft (7); said ratchet wheels (5) are fixedly mounted on two ends of the spiral spring shaft (7), and a reel (8) is provided between the ratchet wheels (5); the ratchet wheels (5), the reel (8), and the spiral spring shaft (7) rotate synchronously, wherein said reel (8) is sleeved on an outside of the spiral spring shaft (7) and they are arranged coaxially; one side of the reel (8)

is provided with an opening for the long webbing (3) to pass through, one end of the long webbing (3) is sleeved on the spiral spring shaft (7) and leads out from one end of the base (6) through the opening on the reel (8), and one end of the spiral spring shaft (7) is connected to a spiral spring box (9), which is characterized in that the other end of the spiral spring shaft (7) is equipped with an inertia brake component (27);

said inertia brake component (27) comprises an inertia brake disc (28), an eccentric brake pawl (29) and an inertia brake cover (30); said inertia brake disc (28) is fixedly connected to the spiral spring shaft (7) and rotating synchronously with the spiral spring shaft (7); a middle part of the inertia brake disc (28) is provided with a C-shaped brake rod (31) with a C-shaped cross-section; a hole is provided in a center of said eccentric brake pawl (29), and a linkage groove (32) and a brake groove (33) is provided in the hole; a diagonal transition segment (38) is provided between the linkage groove (32) and the brake groove (33); said eccentric brake pawl (29) is eccentrically sleeved on the C-shaped brake rod (31), and brake outer teeth (34) are provided on its outer surface away from the brake groove (33); said inertia brake cover (30) is fixedly mounted on the side of the base (6), with the inertia brake disc (28) and the eccentric brake pawl (29) accommodated in the inertia brake cover (30); a plurality of consecutive and circumferentially distributed brake internal teeth (35) are provided on a annular inner wall of the inertia brake cover (30) facing the inertia brake disc (28).

2. The safely winding webbing and tensioning device controlled by inertia centrifugal force of claim 1, wherein one end of said base (6) close to the long webbing (3) is provided with a front cover (15);

said front cover (15) is reserved with a webbing passage (16) for the long webbing (3) to pass through and is provided with symmetrical limiting walls (17); a bottom of said base (6) is provided with symmetrical bar-shaped limiting openings (18), said limiting walls (17) and said limiting openings (18) cooperate to limit each handle (4) so as to avoid the side of each handle (4) interfering with the ratchet wheels (5).

3. The safely winding webbing and tensioning device controlled by inertia centrifugal force of claim 2, wherein said long webbing (3) is connected with a hook (19); said front cover (15) is located at one end of the base (6) with the webbing passage (16) thereon extending to the other end of the base (6), tapering inward to secure one end of the hook (19).

4. The safely winding webbing and tensioning device controlled by inertia centrifugal force of claim 3, wherein an opening of said hook (19) is provided with a safety mechanism (21), comprising a return spring (22) and a safety sleeve (23), said return spring (22) being mounted on the hook (19), and said safety sleeve (23) being sleeved on the return spring (22) and elastically sealing off the opening of the hook (19) under the action of the return spring (22).

5. The safely winding webbing and tensioning device controlled by inertia centrifugal force of claim 1, wherein said long webbing (3) forms a C-shaped corner (24) in the area of the opening of the reel (8), and a protective portion (25) is provided on an inner surface of said C-shaped corner (24); the protective portion (25) is formed by sewing multi layers of long webbing (3) ends, or by one or more layers of a protective pad connected to the long webbing (3) through sewing.

6. The safely winding webbing and tensioning device controlled by inertia centrifugal force of claim 1, wherein one end of said base (6) opposite to the long webbing (3) is provided with a detachable connecting shaft (26), said connecting shaft (26) being connected to one or more kind of short webbing, and hook.

\*   \*   \*   \*   \*